(12) United States Patent
Fehr et al.

(10) Patent No.: US 7,377,498 B2
(45) Date of Patent: May 27, 2008

(54) DEVICE IN PROCESS ENGINEERING COLUMN

(75) Inventors: Emil Fehr, Berg am Irchel (CH); Bruno Keller, Aadorf (CH); Wilhelmus Cornelis Van Leeuwen, Opheusden (NL); John Heggen, IJzendoom (NL)

(73) Assignee: Sulzer Chemtech AG, Winterthur (CH)

( * ) Notice: Subject to any disclaimer, the term of this patent is extended or adjusted under 35 U.S.C. 154(b) by 0 days.

(21) Appl. No.: 11/881,652

(22) Filed: Jul. 27, 2007

(65) Prior Publication Data

US 2007/0272326 A1    Nov. 29, 2007

Related U.S. Application Data

(62) Division of application No. 10/690,437, filed on Oct. 21, 2003, now Pat. No. 7,287,746.

(30) Foreign Application Priority Data

Oct. 23, 2002   (EP)   ................................. 02405911

(51) Int. Cl.
   *B01F 3/04*   (2006.01)
(52) U.S. Cl. ..................... 261/97; 261/110; 261/114.5; 141/237

(58) Field of Classification Search ................... 261/97, 261/110, 114.1, 114.5; 29/897.32; 52/588.1, 52/590.2; 141/237; 202/158, 270
See application file for complete search history.

(56) References Cited

U.S. PATENT DOCUMENTS

| 2,275,572 | A | * | 3/1942 | Somers ..................... 285/125.1 |
| 4,120,919 | A | * | 10/1978 | McClain .................. 261/114.5 |
| 4,396,559 | A | * | 8/1983 | Nutter ...................... 261/112.1 |
| 4,691,493 | A | * | 9/1987 | Larsen ........................ 52/588.1 |
| 5,061,407 | A | * | 10/1991 | Nutter ........................... 261/96 |
| 5,195,789 | A | * | 3/1993 | Walsh et al. ................. 285/331 |
| 7,018,127 | B2 | * | 3/2006 | Walsh et al. ................. 403/294 |
| 7,287,746 | B2 | * | 10/2007 | Fehr et al. ...................... 261/97 |

* cited by examiner

*Primary Examiner*—Scott Bushey
(74) *Attorney, Agent, or Firm*—Francis C. Hand; Carella, Byrne, Bain, et al.

(57) ABSTRACT

The liquid distributor includes a plurality of parallel spaced apart passages for receiving liquid, at least one carrier beam disposed transversely of and over the walls of the passages and at least one sheet metal plate slidably mounted on one of walls of the carrier beam in parallel relation to the wall. The walls of the carrier beam have hooks disposed in apertures of the passages and elevations disposed in recesses in the metal plate.

5 Claims, 5 Drawing Sheets

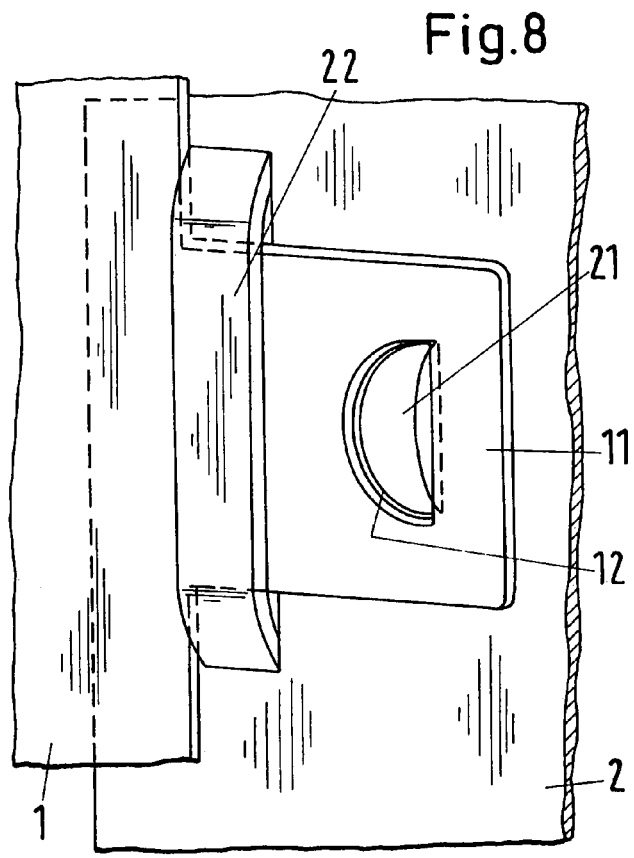
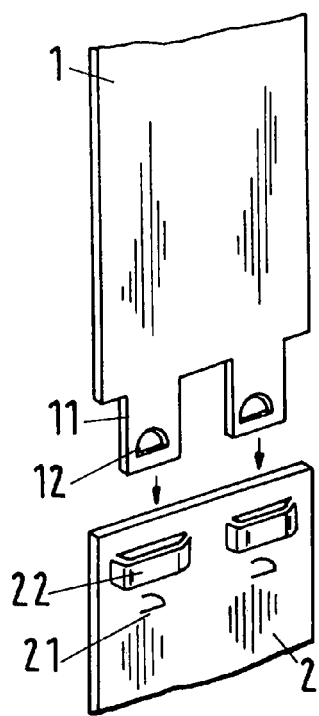
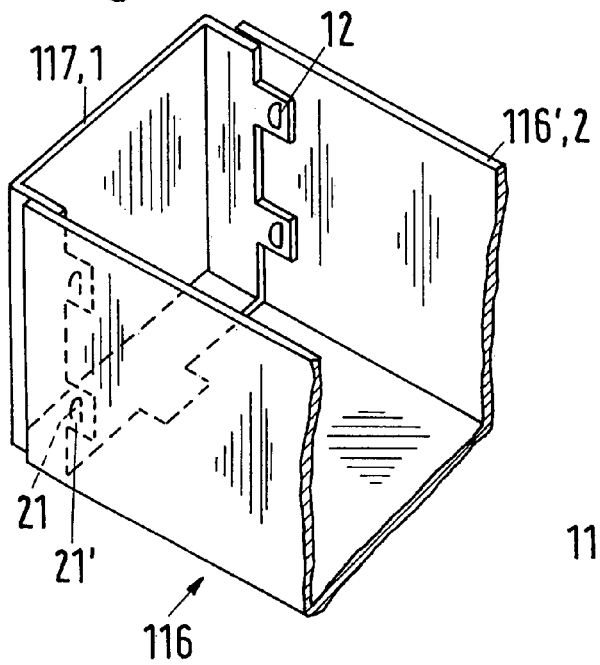
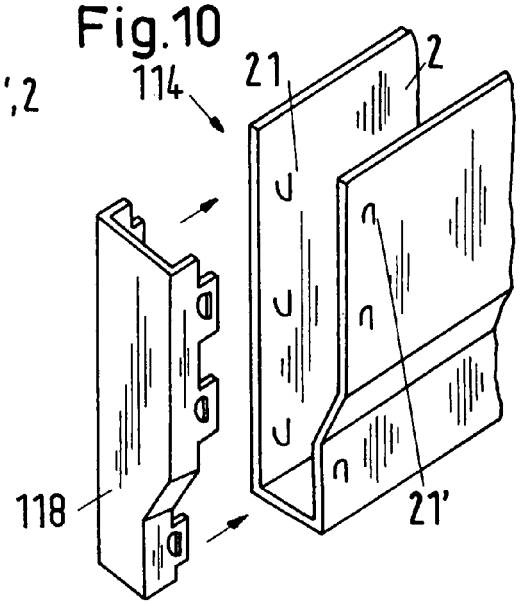

DEVICE IN PROCESS ENGINEERING COLUMN

This application is a Division of Ser. No. 10/690,437, filed Oct. 21, 2003, now U.S. Pat. No. 7,287,746 B2.

This invention relates to a device in a process engineering column as well as to a column having such a device. A "process engineering column" is understood, for example, as a fractionation column with an ordered packing or a tray column.

In a fractionation column which contains an ordered packing for the carrying out of a substance fractionation, for example distillation, and which represents a special form of a process engineering column, a substance and heat exchange takes place between a downwardly flowing liquid phase that acts as a washing film and a steam phase flowing in counterflow. In order for an optimum substance fractionation to result, the liquid must be delivered onto the packing in a homogeneous distribution over the column cross-section by means of distributors, for example, as described in U.S. Pat. No. 5,501,079 and European Patent 1 260 257. In the manufacture of large columns, the manufacturer sets up the liquid distributor in a trial plant in order to test the distribution quality and to make any necessary corrections. It is expedient to strip the distributor into practical components for the transport of the liquid distributor and its installation into the column. A liquid distributor which consists of a main passage and secondary passages connected to it is therefore made such that the secondary passages can be fitted to the main passage by means of releasable connecting means—namely by screws. The distributor can be dismantled by releasing the screws.

It is also advantageous for the above reasons, or also for other reasons, to provide components which can be releasably connected by screw connections in other devices in process engineering trays which are very large. Such a device can, for example, be a fitted element in which a liquid collector is combined with a liquid distributor. The liquid collector can be made up of lamellae which are fitted on a carrier structure. Screw connections are also used for the assembly here. Such a further device can be a downcomer in a tray column.

It is the object of the invention to provide a device for installation into a process engineering column that can be assembled from components and that allows both an installation and a de-installation—a dismantling into individual components—in a time saving manner. The de-installation as well as a later re-installation must be carried out without a time consuming releasing of screws or connecting of screws.

Briefly, the invention provides a device that is constructed for use in a process engineering column and serves in particular for the guiding of liquid. This device includes at least two parts which are made of sheet metal and which can be releasably connected to one another.

One part of the device, a sheet metal part of a first kind, is provided with a recess and the other part, a sheet metal part of a second kind, is provided with an elevation fitting into the recess of the first part. The two sheet metal parts are held in a secured position by a hook connection between the recess and the elevation. The recess and the elevation form a single pair or one pair among a plurality of such pairs and the sheet metal parts have planar regions which lie on top of one another in the neighborhood of the pair or of each pair respectively. In the following, such a pair consisting of a recess and an elevation is termed a "click connection" in brief. A justification for this designation will follow in connection with the description of the drawings.

In accordance with the invention, the click connections appear instead of screw connections which are usual in accordance with the prior art. These click connections can advantageously also be used to establish connections between wall pieces which are usually put together by welding. In such connections, a de-installation possibility does not have to be provided. In an extreme case, such a device consists of two sheet metal strips which are connected to one another by a click connection as well as a second click connection formed by an elevation in the form of a shallow hoop in one part and a tab in the other part that is pushed through the hoop.

The invention allows a distributor to be easily assembled of multiple components and to be easily dis-assembled when desired. Fractionating columns employing such devices may also be readily dis-assembled and re-assembled, for example for repair and/or cleaning purposes.

These and other objects and advantages of the invention will become more apparent from the following detailed description and the accompanying drawings wherein:

FIG. 8 illustrates a perspective view of a closed click connection in accordance with the invention;

FIG. 9 illustrates a part of a trough or of a passage which has a wall piece secured by click connections at its end face;

FIG. 10 illustrates a similar design to that of FIG. 9 for a distribution passage of a liquid distributor with the click connections being open;

FIG. 11 illustrates end regions of two sheet metal strips or sheet metal pieces that can be connected using two click connections in accordance with the invention;

Figure 1:
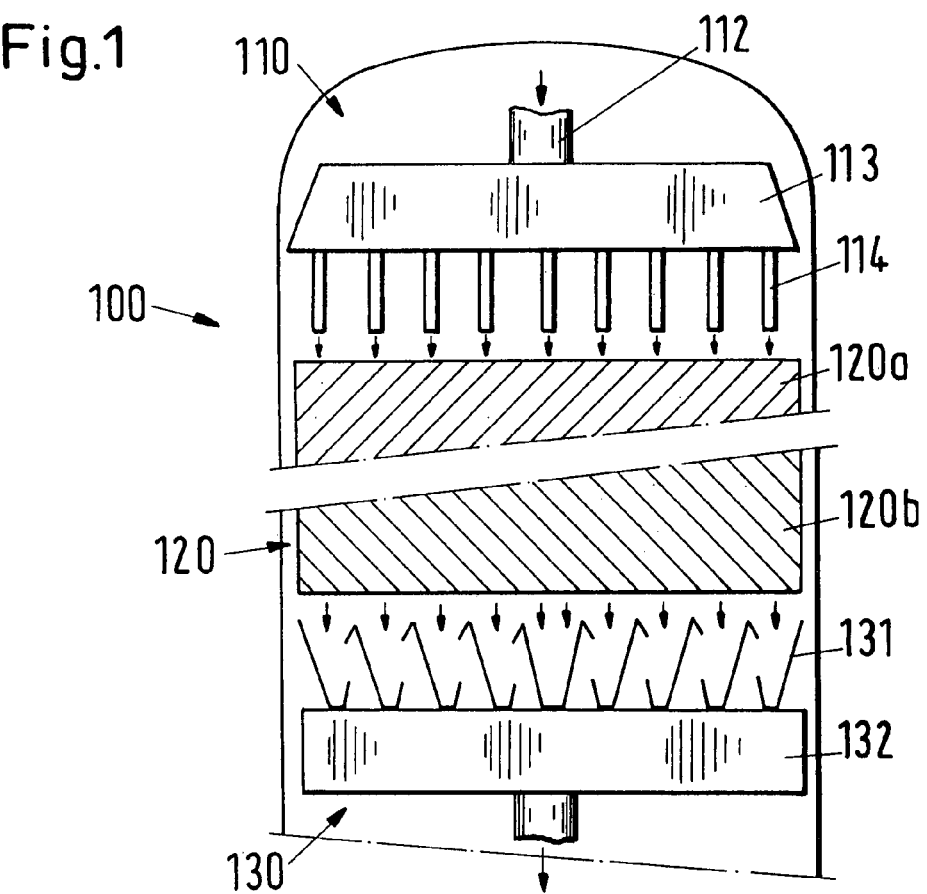
FIG. 1 illustrates an upper section of a process engineering column that contains a packing and a distributor constructed in accordance with the invention.

Referring to FIG. 1, the column 100 is shown sectionally with an upper section containing a packing 120 of which an upper end 120a and a lower end 120b are shown schematically. The packing 120 is, for example, an ordered packing which—put together from corrugated metal foils—forms a "cross-passage structure". As a rule, the packing is made of a plurality of segments (not shown) and largely fills up the whole cross-section of the column 100.

A liquid distributor 110 is arranged above the packing 120 and has a supply line 112 through which a liquid (indicated by arrows) can be fed through a main passage 113 into secondary passages 114 for distribution over the upper end 120a of the packing 120. The main passage 113 and the secondary passages 114 are formed in a known manner such that the liquid is distributed evenly over the whole cross-section of the column 100 and thus over the packing 120.

Figure 2:
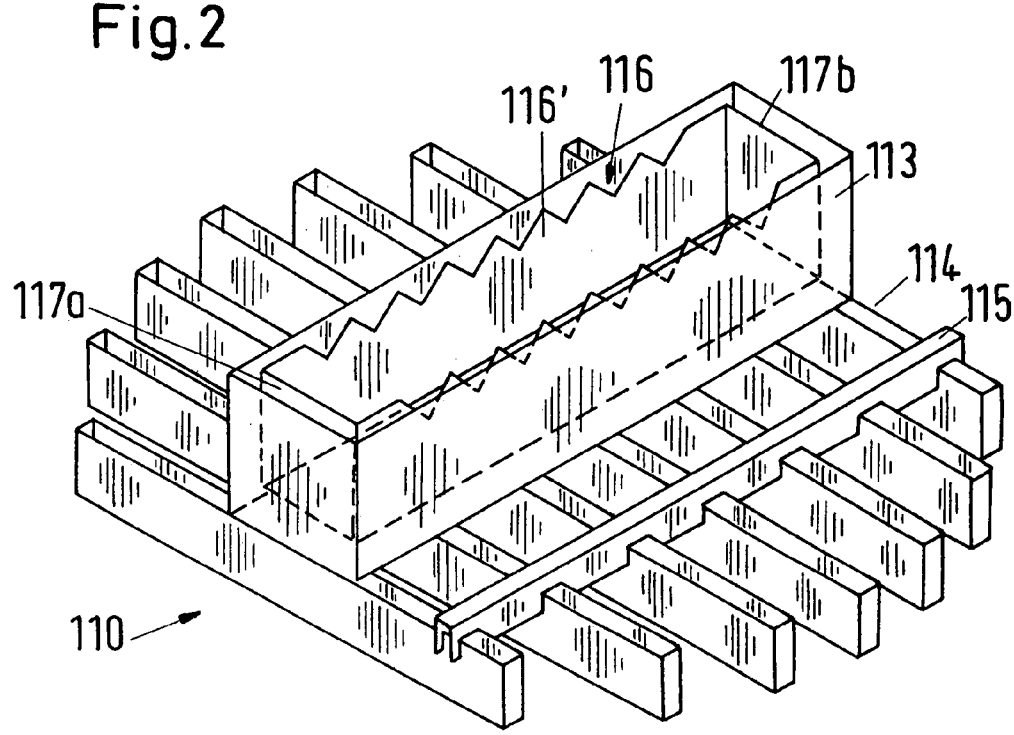
FIG. 2 illustrates a perspective view of the liquid distributor of FIG. 1.

Referring to FIG. 2, the main passage 113 and the secondary passages 114 of the liquid distributor 110 are upwardly open. A pre-distribution passage 116 is arranged in the main passage 113 and is terminated at end faces of a trough-shaped passage part 116' by walls 117a and 117b. The secondary passages 114 are fastened to carrier beams 115 (only one shown). The fastening made in accordance with the invention to the carrier beam 115—namely the click connection—is shown in detail with reference to the following FIGS. 3 to 6. The walls 117a, 117b can be separable sheet metal parts which are likewise fastened to the passage part 116' by means of click connections (cf. FIG. 9 in the following).

Figure 3:
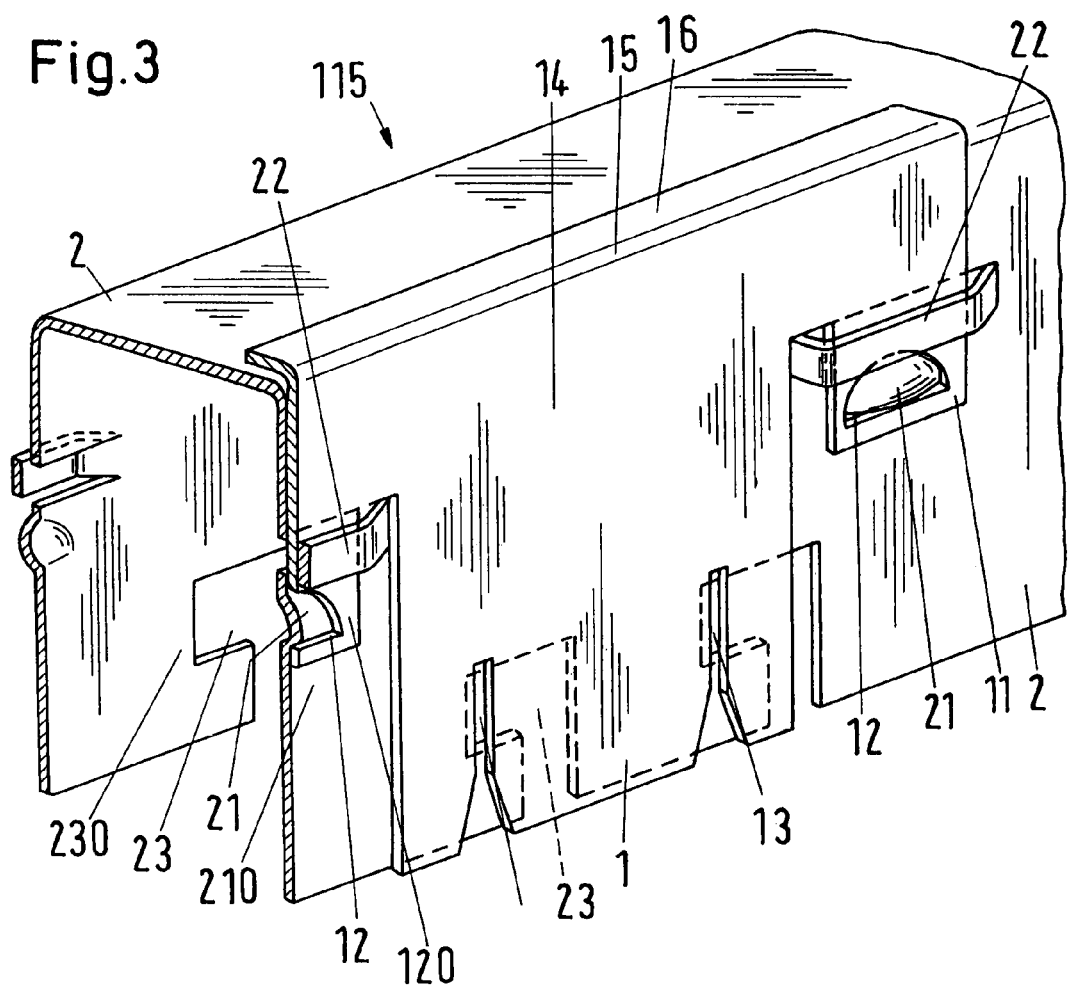
FIG. 3 illustrates a section of a carrier beam of the liquid distributor of FIG. 2 made in accordance with the invention with click connections.

Referring to FIG. 3, a click connection is formed by the carrier beam 115 of the liquid distributor 110 acting as one part 2 of the connection and by a separate sheet metal part 1 acting as the second part of the connection. The first part 1 is formed with a recess 12 and the second part 2 (carrier beam 115) is formed with an elevation 21 that fits into the recess 12.

The two sheet metal parts 1 and 2 are held in a secured position by a hook connection of the recess 12 and of the elevation 21. The interconnection between the recess 12 and the elevation 21 is designated as a click connection. For, on the closing of the click connection, the sheet metal part 1—which is formed in the manner of a tab in the neighborhood of the recess 12—makes a small deflection movement with this tab-like neighborhood which takes place either without a deformation, or, however, elastically, and in which, after the closing operation, the elevation 21 latches in the recess 12. If the deflection movement is associated with an elastic deformation, there is, as a rule, a click sound when the latched connection engages.

The sheet metal parts 1, 2 have planar regions 120 and 210 respectively in the neighborhood of the pairs of recesses 12 and elevations 21 and these planar regions each lie on top of one another in the closed click connection.

A further elevation 22 is arranged in the sheet metal part 2 in the shape of a shallow hoop and lies within a planar neighbouring region of the part 2. A tab 11 of the sheet metal part 1 of the first kind is pushed between the hoop 22 and its planar neighboring region on the closing of the click connection. The elevation 21 is arranged in the region of the pushed in tab 11.

Referring to FIGS. 2 and 3, the sheet metal part 2 has hook-like recesses 23 which lie in planes 230 of the side walls of the carrier beam 115 in order to fit the carrier beam 115 over the walls of the secondary passages 114.

Figure 4:
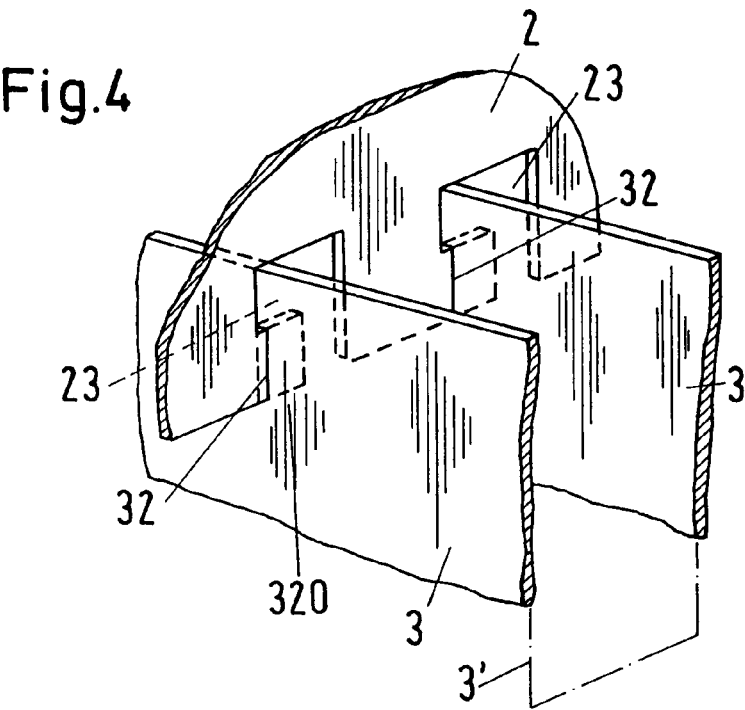
FIG. 4 illustrates a detail relating to the carrier beam of FIG. 3.

In addition, as shown in FIG. 4, each wall of a secondary passage forms a sheet metal part 3 of a third kind that has slot-like apertures 32 in planar sections 320 that receive the hook-like recesses 23 of the of the sheet metal part 2 with the planes 230 of the hook-like recesses 23 arranged transversely to the planar sections 320 of the slot-like apertures 32. The sheet metal part 3 of the third kind is suspended with the slot-like apertures 32 engaging the hook-like recesses 23 of the second sheet metal part 2. The line 3' drawn as a chain-dotted line indicates that the two wall pieces of the sheet metal part 3 continuously form a passage.

The sheet metal part 1 of the first kind—see FIG. 3—has slots 13 into which the planar section 320 of the sheet metal part 3 of the third kind are pushed (not shown). The pairs consisting in each case of a recess 12 and an associated elevation 21 are in the hooked together state shown in FIG. 3. The hanging connection between the sheet metal part 2 of the second kind to the sheet metal part 3 of the third kind is thus secured by the sheet metal part 1 of the first kind.

Figure 5:
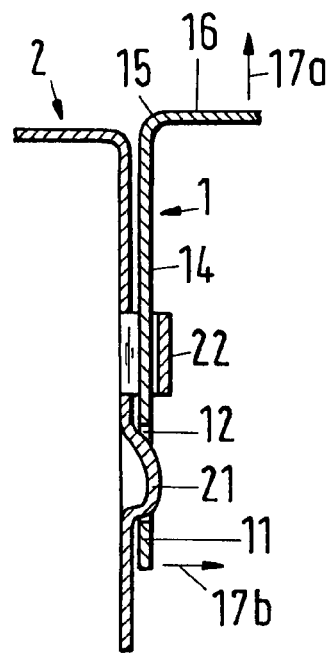
FIG. 5 illustrates a section through a closed click connection formed by two sheet metal parts.

The sheet metal part 1 of the first kind shown in FIG. 3—see also FIG. 5—includes a large planar area 14 which merges into two tabs 11 with the recesses 12. This large area 14 also merges via a bending edge 15 into a strip-shaped area 16. The sheet metal part 2 of the second kind accordingly has two hoops 22 and two elevations 21 associated with the recesses 2.

The sheet metal part 1 of the first kind can be arranged in two orientations: in the one orientation, the strip-shaped area 16 is directed away from the sheet metal part 2 of the second kind (FIG. 5); in the other orientation, the strip-shaped area 16 is directed towards the sheet metal part 2 of the second kind (FIG. 3). If, in the orientation shown in FIG. 5, the strip 16 is pulled upwardly (arrow 17a), a tilting movement (arrow 17b) is created by which the recess 12 is tilted away out of the effective region of the elevation 22. The sheet metal part 1 of the first kind is thus released from the hook connection by pulling in the direction of the arrow 17a without any special effort and can be removed easily. In the other orientation, FIG. 4, no corresponding tilt movement results: the sheet metal part 1 of the first kind is hooked securely. This second orientation is therefore suitable for a definitive assembly, whereas the first orientation is advantageous for a provisional assembly for test purposes. The click connections are naturally also still releasable after a definitive assembly (by means of a tool, or as a result of the manipulative skill of the assembler).

In FIG. 1, a collector 130 is also shown in addition to the liquid distributor 110 and is arranged under the lower end 120b of the packing. Lamellae 131 are attached to a carrying construction 132. The connection between the lamellae 131 and the carrying construction 132 can also be established with click connections; the liquid collector 130 is thus a further example of a device in accordance with the invention. The carrying construction 132 is advantageously formed as a collection passage which guides the liquid collected with the lamellae 131 to a central discharge 133 through which the liquid can be fed into a further distributor (not shown).

Figure 6:
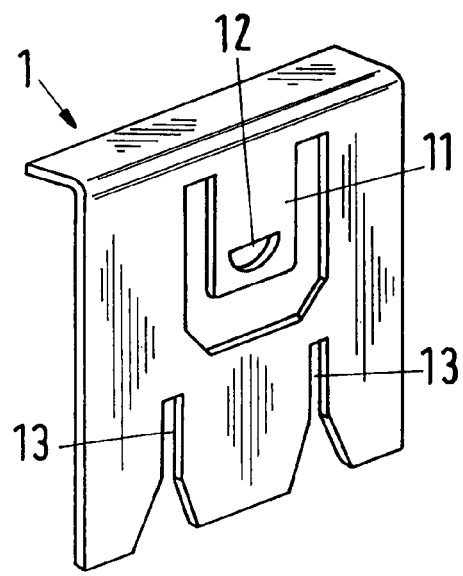
FIG. 6 illustrates a perspective view of a modified sheet metal part of a first kind.

FIG. 6 shows a sheet metal part 1 of the first kind with respect to a variant shape of the click connection shown in FIG. 5. Here, the part 1 has a single tab 11 and a single recess 12 so that the click connection is only formed by a pair consisting of an elevation 21 and a recess 12. The first variant (FIG. 3) with two such pairs can be handled better and can be made with less precision.

Figure 7:
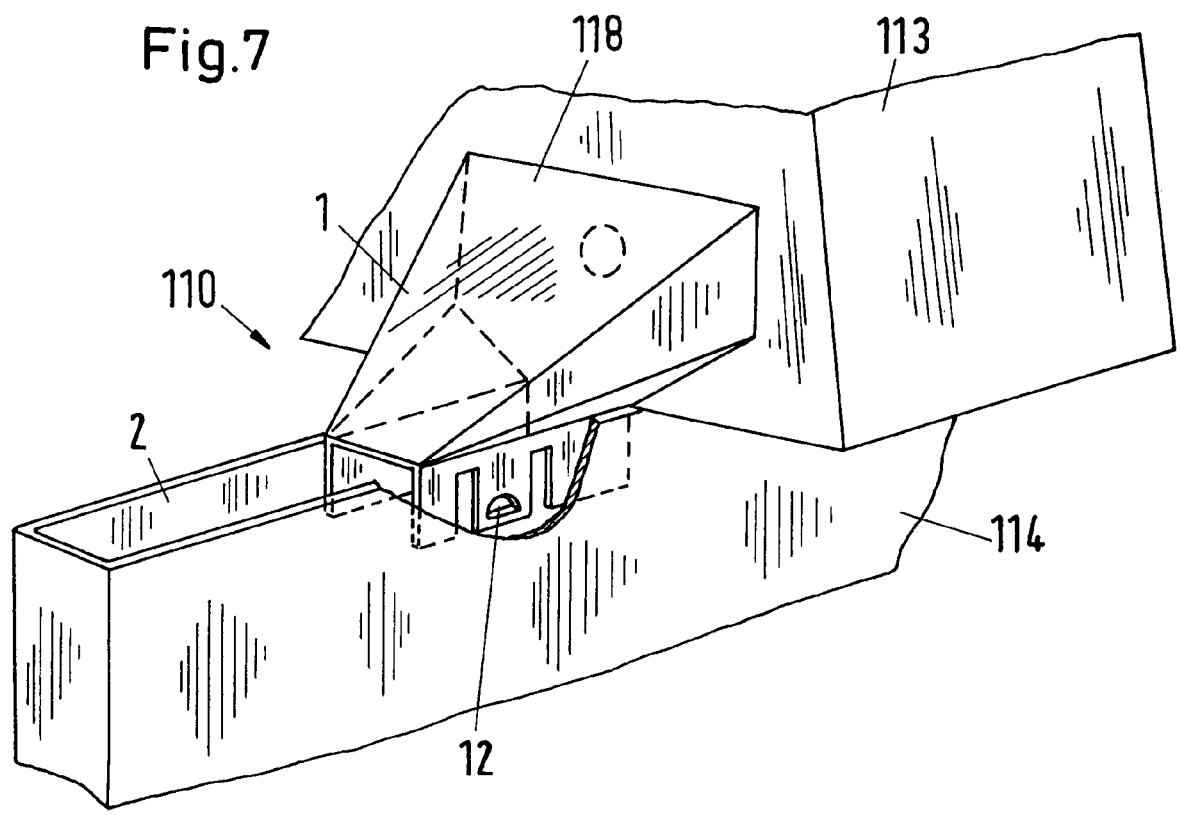
FIG. 7 illustrates a part of a special liquid distributor which is formed in accordance with the invention.

FIG. 7 shows a part of a liquid distributor 110 formed in accordance with the invention which has a special discharge system at the side walls of the main passage 113. This discharge system includes guide members 118 with which the liquid to be distributed is guided from the main passage 113 into the secondary passages 114. The guide members 118 are each fixed by means of two click connections to the side walls of the secondary passages 114. Only the recess 12 of a click connection is shown. The corresponding elevation 21 and a hoop 22 (see FIG. 3)—which does not necessarily have to be present—are located on a wall piece of the secondary passage 114 which is broken away in the representation. Expressed with the designations which have been used for the definition of the device in accordance with the invention, the guide member 118 is the sheet metal part 1 of the first kind and the secondary passage 114 is the sheet metal part 2 of the second kind.

Referring to FIG. 8, wherein like reference characters indicate like parts as above, a closed click connection is formed by the interconnection of a sheet metal piece 1 (with a tab 11 and a recess 12) and a sheet metal piece 2 (with a hoop 22 and an elevation 21).

FIG. 9 shows a part of a trough or of a passage 116 which has a wall piece 117 fastened to an end face with click connections. This passage 116 can, for example, be a pre-distribution passage which is arranged within the main passage 113 shown in FIG. 2 and which is terminated at the end faces of the trough-like passage part 116' by the wall piece 117. Only the recesses 12 and the elevations 21 of the click connections are indicated, with the elevations 21 appearing as recesses 21' on the outside of the passage part 116'. Advantageously, hoops 22 (not shown) are also provided as components of the click connections.

FIG. 10 shows a similar design to that of FIG. 9 for a distribution passage 114 of a liquid distributor. A side wall 118, which is shown in a separated state, can be fitted to the wall of the distribution passage 114 by click connections.

FIG. 11 shows end regions of two sheet metal strips or of sheet metal pieces 1 and 2 which can be connected by two click connections 11, 12, 21, 22.

Figure 12:
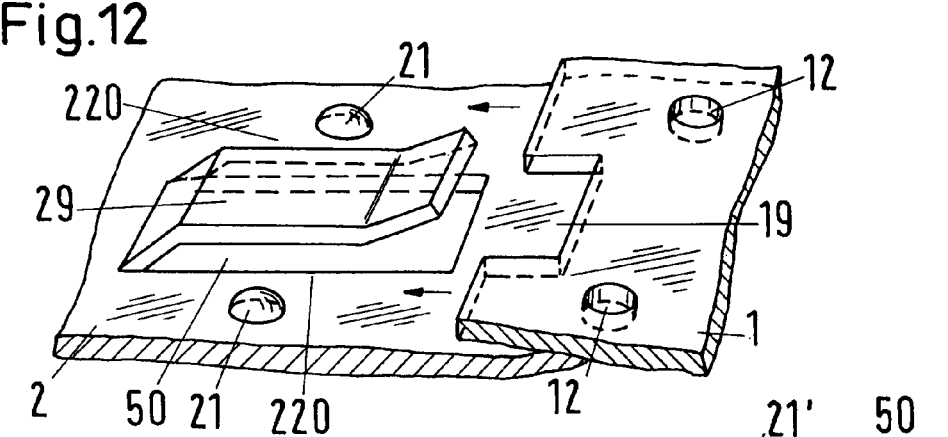
FIG. 12 illustrates a further click connection in accordance with the invention.
Figure 13:
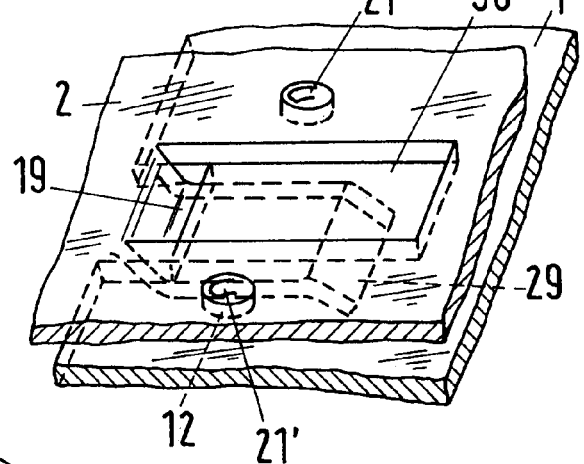
FIG. 13 illustrates the click connection of FIG. 12 seen from the rear side.

Referring to FIGS. 12 and 13, wherein like reference characters indicate like parts as above, a click connection is formed by a part 2 having a rectangular, or approximately rectangular, area 50 reshaped into a tab 29. This tab 29 can be deflected in a spring elastic manner. In addition a pair of elevations 21 are formed in the part 2 within a planar neighboring region 220 of the tab 29. The other part 1 of the connection has a recess 19 in an edge of a flat piece of sheet metal and a pair of recesses 12 in the form of apertures to opposite sides of the edge recess 19.

In use, the part 1 is pushed in between the tab 29 and its planar neighboring region 220 in the direction of the two arrows drawn in FIG. 12 with the tab 29 pushed into the recess 19. After a hook connection between each recess 12 and an elevation 21, the position of the sheet metal part 1 of the first kind is fixed largely without clearance—preferably under the effect of a spring force of the tab 29.

The two recesses 12 and elevations 21 form two pairs.

In FIG. 13, the elevations 21 appear as recesses 21'.

Figure 14:
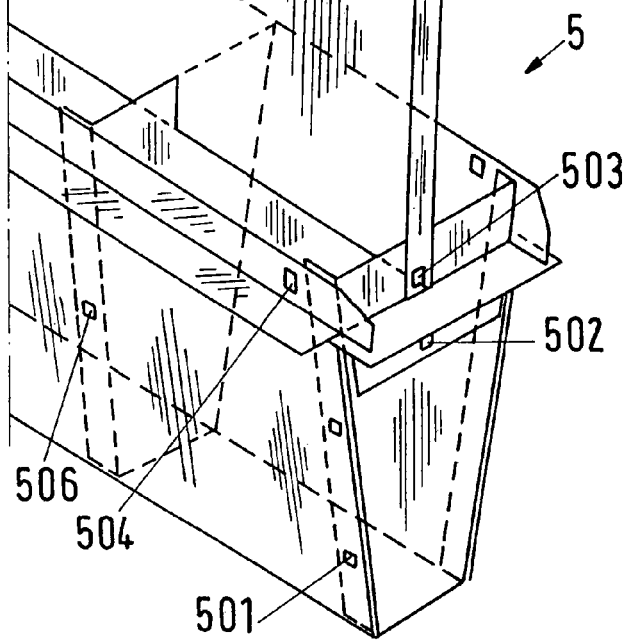
FIG. 14 illustrates a downcomer of a tray column employing the click connections of FIG. 13.

In the embodiment of FIGS. 12 and 13, the click connection is tighter than the click connection with the hoops 22. It is therefore better suited for a different application, for example for the manufacture of a downcomer for a tray column. Such a downcomer 5 is shown in FIG. 14 and is made up from diverse sheet metal parts which are connected to one another by means of click connections 510 to 504. These click connections 510 to 504 are represented by small rectangles. Each of these rectangles corresponds to a recess 50 such as can be seen in FIG. 13.

The invention thus provides a device that allows the components of a processs engineering column to be assembled and dis-assembled into individual components in a time saving manner.

The invention further eliminates the need to secure the parts of a process engineering column, such as a liquid distributor and a downcomer, together using screws.

The invention claimed is:

1. In combination
   a plurality of parallel spaced apart passages for receiving liquid therein, each said passage having a pair of upstanding walls, each said wall having a pair of apertures therein;
   at least one carrier beam disposed transversely of and over said walls of said passages, said beam having a pair of parallel depending walls, one of said walls of said beam having an elevation therein and each of said walls of said beam having at least a pair of hook-shaped recesses receiving said upstanding walls of a respective passage therein and a pair of hooks disposed in said apertures of said received wall; and
   at least one sheet metal plate slidably mounted on one of said walls of said carrier beam in parallel relation to said one wall, said plate having a pair of slots receiving said walls of said respective passage therein and a recess receiving said elevation of said beam therein to releaseably secure said respective passage and said carrier beam together.

2. The combination as set forth in claim 1 further comprising a hoop disposed on said carrier beam and receiving a portion of said plate with said recess therein to maintain said portion of said plate in parallel with said wall of said carrier beam.

3. The combination as set forth in claim 1 wherein said plate has a pair of parallel portions, each said portion having a respective recess therein, and wherein said one wall of said beam has a pair of said elevations thereon for reception in each respective recess.

4. The combination as set forth in claim 1 further comprising a tab on said carrier beam for resiliently engaging said plate with said recess of said plate receiving said elevation of said carrier beam therein.

5. The combination as set forth in claim 1 wherein said elevation of said beam is elastically fitted into said recess of said sheet metal plate to form a latched click connection.

* * * * *